G. A. GIBESON.
CUTTER HEAD.
APPLICATION FILED DEC. 26, 1911.
1,032,891.
Patented July 16, 1912.
2 SHEETS—SHEET 1.
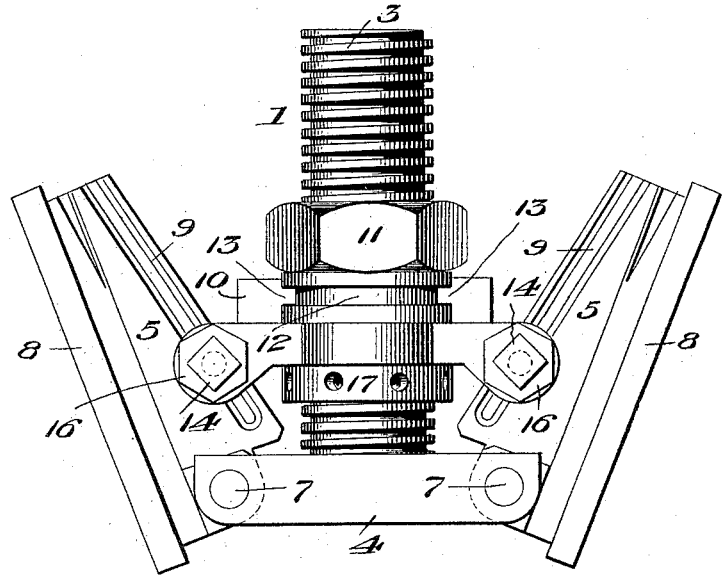
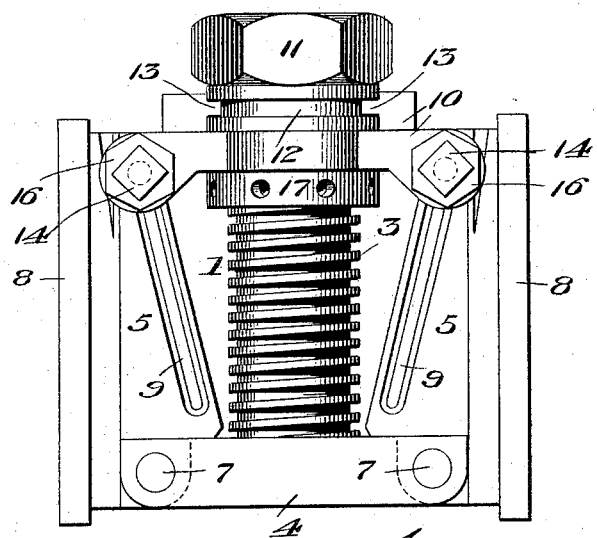
WITNESSES
INVENTOR
George A. Gibeson G. A. GIBESON.
CUTTER HEAD.
APPLICATION FILED DEC. 26, 1911.
1,032,891.
Patented July 16, 1912.
2 SHEETS—SHEET 2.
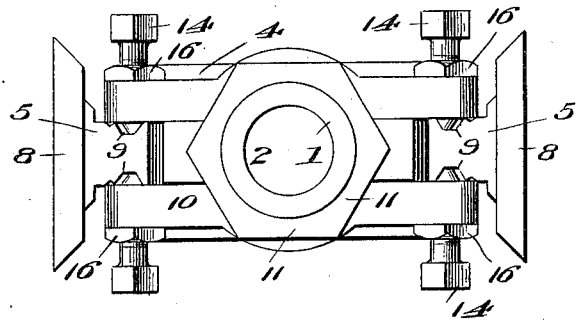
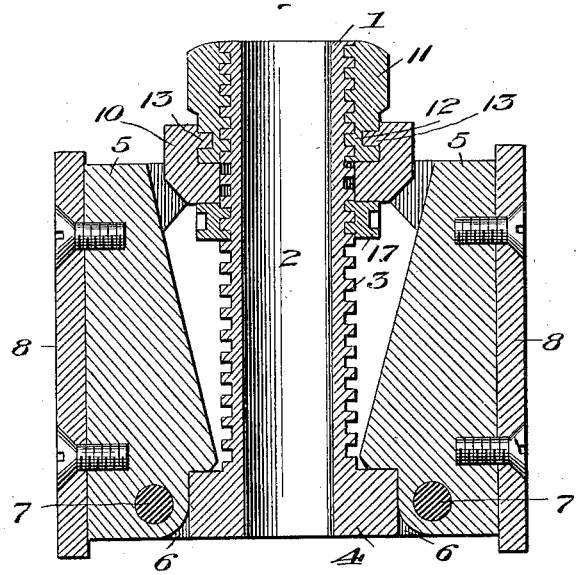
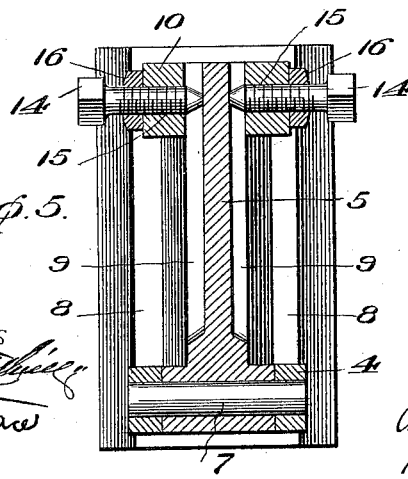
WITNESSES
INVENTOR
George A. Gibeson

UNITED STATES PATENT OFFICE.

GEORGE A. GIBESON, OF NORWOOD, NEW YORK, ASSIGNOR TO SAMUEL J. SHIMER & SONS, OF MILTON, PENNSYLVANIA, A CORPORATION OF PENNSYLVANIA.

CUTTER-HEAD.

1,032,891. Specification of Letters Patent. Patented July 16, 1912.

Application filed December 26, 1911. Serial No. 667,676.

*To all whom it may concern:*

Be it known that I, GEORGE A. GIBESON, a citizen of the United States, residing at Norwood, in county of St. Lawrence and State of New York, have invented certain new and useful Improvements in Cutter-Heads, of which the following is a specification.

My invention relates to an improvement in cutter-heads in which the cutting arms or wings are pivoted so as to permit of adjustment radially or diametrically to vary the angle of cut from 45° to any degree line down to 22½°, and with this object in view my present invention comprises a threaded hub adapted to be secured on the upright shaping machine spindle or molder and having a head at one end with arms or wings pivoted to the head and carrying knives in connection with a nut mounted to turn on the threads of the hub, a yoke centered upon the hub with which the nut is rotatably connected, and means carried by the yoke taking into guides preferably in the form of grooves in the arms or wings for causing the simultaneous diametrical adjustment of the arms and knives carried on the arms.

My invention still further consists in connection with the foregoing elements of certain novel features of construction and combinations of parts which will be hereinafter described and pointed out in the claims.

In the accompanying drawings:—Figures 1 and 2 are views in side elevation showing the parts in two different adjustments, Fig. 3 is a top plan view, Fig. 4 is a vertical section, Fig. 5 is a section through an outer end of the yoke, one of the side arms or wings, and the set screws bearing in the grooves oppositely located therein, and Fig. 6 is a diagrammatic illustration indicating a variety of cuts which may be made by different adjustments of my improved cutter-head.

The hub 1 is counterbored through the axial center as at 2 to receive the upright shaping machine spindle or molder upon which it is adapted to be held by means of a nut at the top in the usual manner, (not shown). The hub is provided with a screw-thread 3 externally of moderate pitch. At the lower end, the hub is provided with a head 4 preferably rectangular in form.

Side arms or wings 5, 5, are fitted into slots or recesses 6, 6, in the outer ends of the head 4, in which they are pivotally secured by means of pins 7, 7. While these arms may be variously constructed, in the particular form illustrated their outer edges converge and the knives 8, 8, may be secured to their outer edges in any approved manner, either as shown or otherwise. These arms or wings are provided with grooves 9, 9, which in the illustrated form of the invention extend parallel with their inner edges.

A yoke 10 encompasses the threaded hub, and it is raised and lowered on the hub by means of the nut 11, which latter is circumferentially grooved as at 12, and receives the inwardly-projecting lugs 13, 13, on the yoke whereby the nut is rotatably connected with the yoke, and as the nut is turned on the threaded hub, the yoke is carried with it. The outer ends of the yoke are formed to embrace and fit the inner edges of the arms or wings 5, 5, and set screws 14, 14, screw in threaded orifices 15, 15, in the ends of the yoke, their inner ends being tapered and extending into the grooves 9, 9, so that as the nut 11 is turned, the inner ends of the set-screws traverse the grooves in the arms and adjust the arms inwardly or outwardly as the case may be, whereby to regulate the adjustment and the angle of cut of the knives. The set-screws are held in place by jam-nuts 16, 16, thereon. Jam nut 17 on the threaded hub is to firmly hold the yoke in its position when the tool is in use.

This combination of elements affords ready and accurate adjustment of the cutting knives and holds them rigidly in the adjustment desired.

It is evident that more or less slight changes might be resorted to in the form and arrangement of parts described without departure from the spirit and scope of my invention, and hence I do not wish to be limited to the exact construction herein set forth, but:—

Having fully described my invention, what I claim as new and desire to secure by Letters Patent, is:—

1. In a cutter-head, the combination with a threaded hub having a head on one end, a nut mounted to turn on the threads, and arms or wings pivotally connected with the head and adapted to carry the knives, said arms or wings having inclined guides, and a yoke carried by the nut and with which the latter is rotatably connected, said yoke having adjustable means which have sliding connection with the guides on the arms.

2. The combination with a threaded hub having a head thereon, and two nuts adapted to screw on the threads of the hub, of a yoke encircling the threaded hub and with which one nut is rotatably connected and which the other nut is adapted to lock in place, arms pivotally connected with the head and adapted to carry knives, said arm having inclined grooves, and set-screws carried by the yoke which take into the grooves in the arms for the purpose of swinging the latter on their pivots and adjusting them when the yoke is adjusted along the threaded hub.

3. In a cutter-head, the combination with a hollow threaded hub having a fixed head at one end, wings or arms pivotally connected with the head and carrying knives, said wings or arms having grooves, of a nut internally screw-threaded and mounted to turn on the threads of the hub, a yoke rotatably connected with the nut, the outer ends of the yoke straddling the wings or arms and provided with set-screws which extend into the grooves of said wings or arms with which they are slidably connected.

In testimony whereof I affix my signature, in the presence of two witnesses.

GEORGE A. GIBESON.

Witnesses:
J. B. PRINGLE,
ROSE E. FLYNN.

Copies of this patent may be obtained for five cents each, by addressing the "Commissioner of Patents, Washington, D. C."